United States Patent
Shimamura (10) Patent No.: US 12,185,662 B2
(45) Date of Patent: Jan. 7, 2025

(54) CONTROL APPARATUS OF AUTONOMOUSLY NAVIGATING WORK MACHINE

(71) Applicant: Honda Motor Co., Ltd., Tokyo (JP)

(72) Inventor: Hideaki Shimamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 593 days.

(21) Appl. No.: 17/292,632

(22) PCT Filed: Nov. 20, 2018

(86) PCT No.: PCT/JP2018/042745
§ 371 (c)(1),
(2) Date: May 10, 2021

(87) PCT Pub. No.: WO2020/105101
PCT Pub. Date: May 28, 2020

(65) Prior Publication Data
US 2022/0000017 A1    Jan. 6, 2022

(51) Int. Cl.
*A01D 34/00* (2006.01)
*A01D 101/00* (2006.01)
(Continued)

(52) U.S. Cl.
CPC ....... *A01D 34/008* (2013.01); *B60W 60/0025* (2020.02); *G05D 1/0212* (2013.01); *G05D 1/0274* (2013.01); *A01D 2101/00* (2013.01)

(58) Field of Classification Search
CPC ............. A01D 34/008; A01D 2101/00; B60W 60/0025; G05D 1/0212; G05D 1/0274; G05D 2201/0208
See application file for complete search history.

(56) References Cited

U.S. PATENT DOCUMENTS

2013/0238130 A1* 9/2013 Dorschel .............. A01D 34/008
701/25
2014/0032033 A1* 1/2014 Einecke ................. G06V 20/10
701/27
(Continued)

FOREIGN PATENT DOCUMENTS

JP    H04333903 A    11/1992
JP    2009265941 A    11/2009
(Continued)

OTHER PUBLICATIONS

International Search Report; Application PCT/JP2018/042745; Feb. 26, 2019.

*Primary Examiner* — Naeem Taslim Alam
(74) *Attorney, Agent, or Firm* — Duft & Bornsen, PC (57) ABSTRACT

A control apparatus of an autonomously navigating work machine driven by drive units while servicing a work area which is equipped with an information acquisition unit that acquires information relating to a navigation-desired region where navigation is desired inside or outside of the work area, a search unit that searches for a navigation route from a current location of the work machine to a desired location based on acquired information relating to the navigation-desired region, and a control unit that drives the work machine to run by driving the drive units in accordance with the navigation route searched by the search unit.

18 Claims, 8 Drawing Sheets

(51) Int. Cl.
    *B60W 60/00*     (2020.01)
    *G05D 1/00*     (2024.01)

(56) References Cited

U.S. PATENT DOCUMENTS

| | | |
|---|---|---|
| 2014/0058611 A1 | 2/2014 | Borinato |
| 2015/0220086 A1* | 8/2015 | Willgert ............... A01D 34/008 701/26 |
| 2016/0302354 A1* | 10/2016 | Franzius ............... A01D 34/008 |
| 2018/0255704 A1* | 9/2018 | Kamfors ............... A01D 34/008 |
| 2020/0050208 A1* | 2/2020 | Frick ....................... G05D 1/027 |
| 2020/0267896 A1* | 8/2020 | Ingvalson ............ G05D 1/0223 |

FOREIGN PATENT DOCUMENTS

| | | | |
|---|---|---|---|
| JP | 2013103135 A | 5/2013 |
| JP | 2016186749 A | 10/2016 |
| JP | 2016186750 A | 10/2016 |

\* cited by examiner

CONTROL APPARATUS OF AUTONOMOUSLY NAVIGATING WORK MACHINE

TECHNICAL FIELD

This invention relates to a control apparatus of an autonomously navigating work machine driven by drive units to autonomously navigate while performing work within a work area.

BACKGROUND ART

As taught by Patent Document 1, the control apparatus of an autonomously navigating work machine of this type according to the prior art defines a boundary line marking outer perimeter of the work area using, for example, a current-carrying wire or the like, and also defines the boundary lines of ponds and other such unserviceable regions within the work area using similar wires or the like.

PRIOR ART DOCUMENT

Patent Document

Patent Document 1: Specification of U.S. Unexamined Patent Application Publication No. 2014/0058611

SUMMARY OF THE INVENTION

Problems to be Solved by Invention

When the work area is a lawn, the route of the work machine as it moves toward a destination such as a charging station preferably allows the work unit to advance through desired navigation regions while avoiding passage through unserviceable regions as much as possible. The technology disclosed by the aforesaid Patent Document 1 is not altogether adequate regarding this point.

The object of this invention is therefore to provide a control apparatus of an autonomously navigating work machine adapted to control route of the work machine when moving toward a destination to pass through desired regions to the utmost possible.

MEANS FOR SOLVING OBJECT

In order to achieve the object, this invention provides a control apparatus of an autonomously navigating work machine driven by drive units while servicing a work area, characterized in that the apparatus comprises: an information acquisition unit that acquires information relating to a navigation-desired region where navigation is desired inside or outside of the work area; a search unit that searches for a navigation route from a current location of the work machine to a desired location based on acquired information relating to the navigation- desired region; and a control unit that drives the work machine to run by driving the drive units in accordance with the navigation route searched by the search unit.

DESCRIPTION OF EMBODIMENTS

First Embodiment

Figure 1:
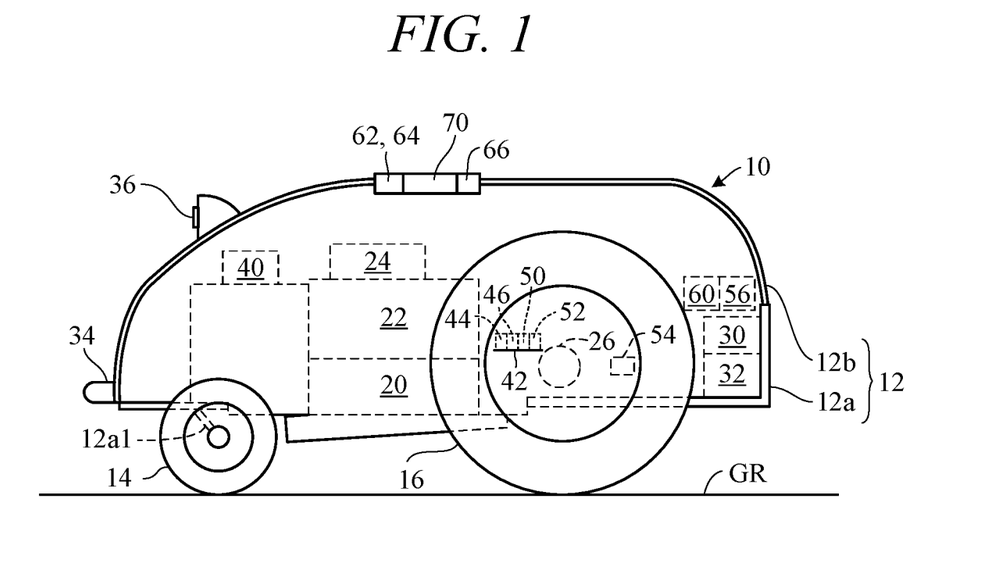
FIG. 1 is an explanatory side view of an autonomously navigating work machine according to a first embodiment of this invention.
Figure 2:
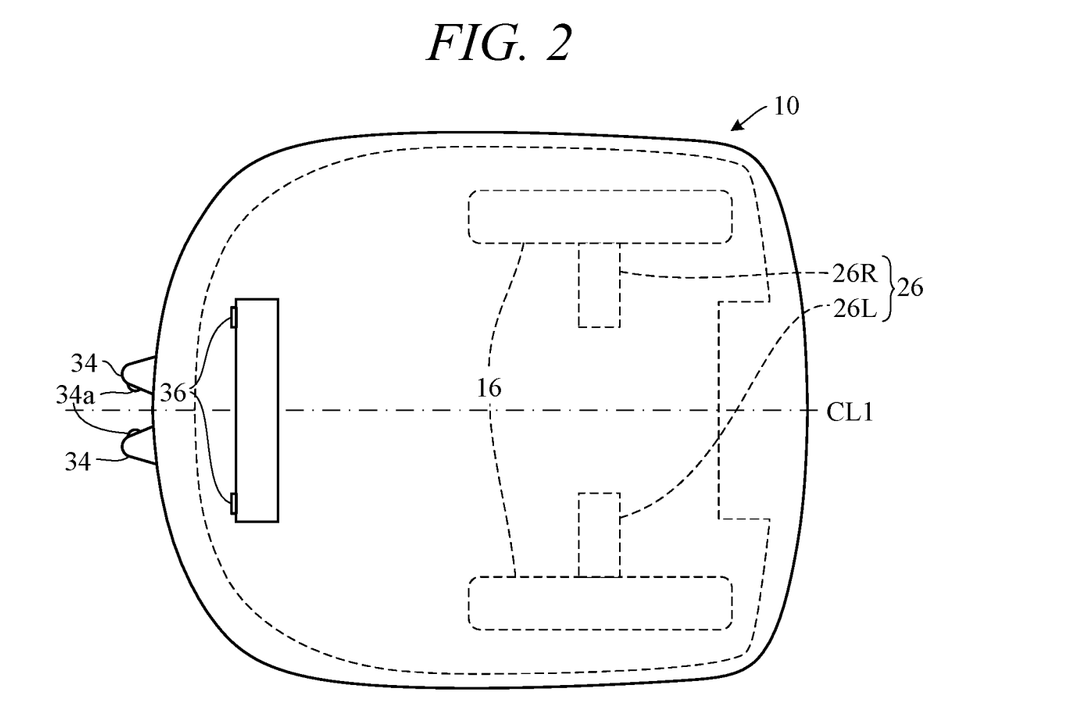
FIG. 2 is a top view of the autonomously navigating work machine of FIG. 1.
Figure 3:
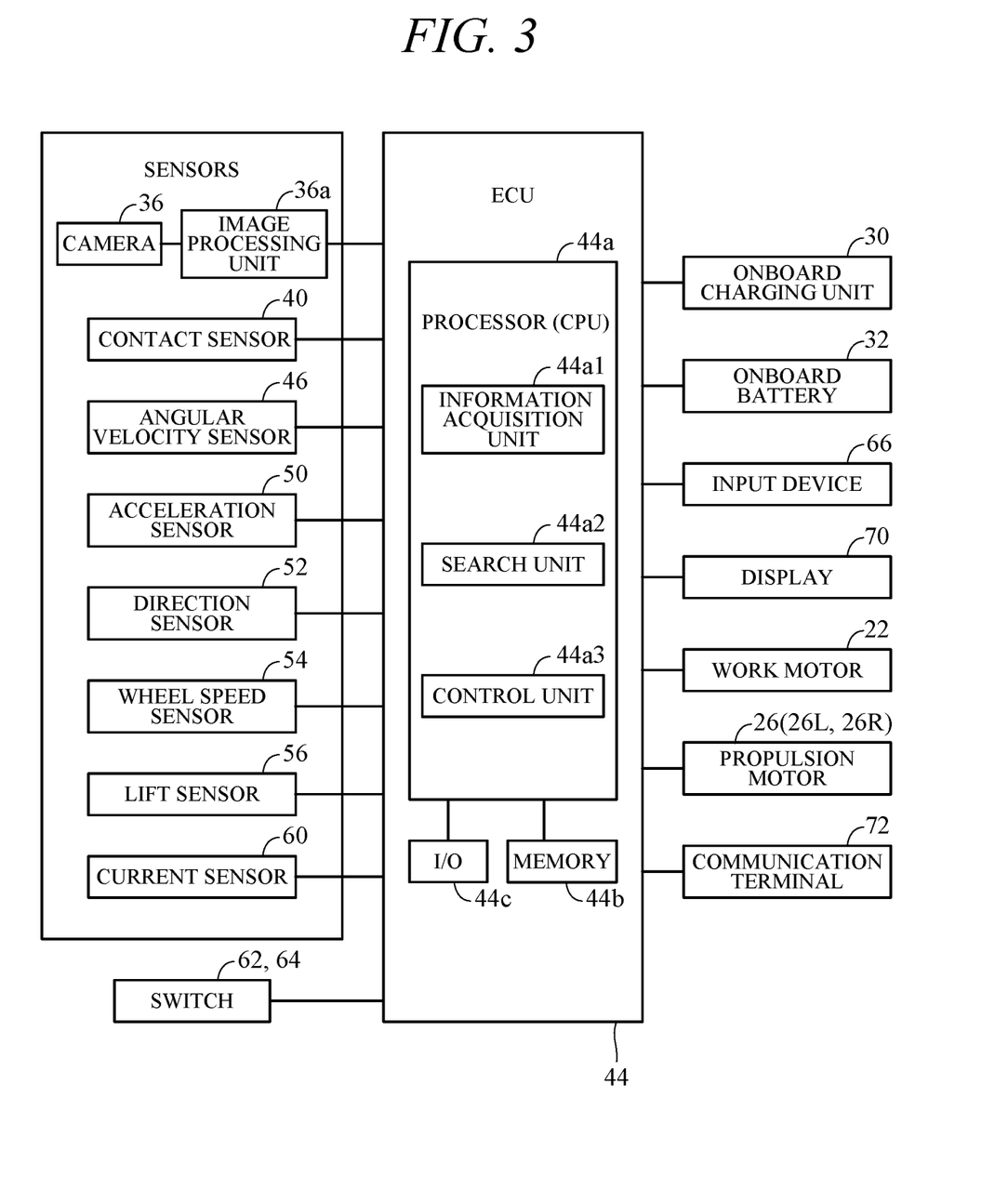
FIG. 3 is a block diagram showing input-output relationships of an ECU (electronic control unit) of FIG. 1.

FIG. 1 is an explanatory side view of an autonomously navigating work machine according to a first embodiment of this invention. FIG. 2 is a top view of the autonomously navigating work machine of FIG. 1. FIG. 3 is a block diagram showing input-output relationships of an ECU (Electronic Control Unit) of FIG. 1.

In the following description, direction of advance (forward-rearward direction) of the work machine 10 as viewed from above, lateral direction (left-right direction) perpendicular thereto, and vertical direction perpendicular to direction of advance and lateral direction are termed forward-rearward direction, left-right direction and upward-downward direction, respectively, and structural features are explained in line with this terminology.

Reference numeral 10 in FIG. 1 designates an autonomously navigating work machine (hereinafter called "work machine.") Specifically, the work machine 10 comprises a lawn mower. A body (base member) 12 of the work machine 10 is equipped with a chassis 12a and a frame 12b attached to the chassis 12a.

The work machine 10 is equipped with two (left and right) front wheels 14 of relatively small diameter fixed through stays 12a1 to longitudinal (fore-aft) front end of the chassis 12a and with left and right rear wheels 16 of relatively large diameter directly attached to rear end of the chassis 12a.

A lawn mower work blade (rotary blade; hereinafter called "blade") 20 is attached to the chassis 12a near the middle thereof and an electric motor (hereinafter "work motor") 22 is installed above it. The blade 20 is connected to the work motor 22 and driven to rotate thereby.

A blade height regulation mechanism 24 manually operable by a user is connected to the blade 20. The blade height regulation mechanism 24 has a screw (not shown) and is structured to be adjustable the height of the blade 20 from the ground GR in the upward-downward direction when the user turns the screw by hand. Blade height can optionally be power regulated rather than manually.

Two electric motors (drive units; hereinafter called "propulsion motors") 26L and 26R are attached to the chassis 12a rearward of the blade 20. The propulsion motors 26L and 26R are connected to the left and right rear wheels 16 and rotate the rear wheels 16 normally (rotation to forward) or reversely (rotation to rearward direction) independently on the left and right, while making the front wheels 14 as driven wheels and the rear wheels 16 as drive wheels. The blade 20, work motor 22 and propulsion motor 26 are covered by the frame 12b.

The work machine 10 is of such weight and size as to be portable by the user. For example, the work machine 10 has a total length (fore-aft length) of about 71 cm, total width of about 55 cm, and height of about 30 cm.

An onboard charging unit 30 and an onboard battery 32 connected thereto are housed at the rear of the work machine 10, and a pair of battery charging terminals 34 are attached to the frame 12b so as to project forward in running direction. The onboard battery 32 is constituted as, for example, a lithium-ion battery.

The battery charging terminals 34 are connected to the onboard charging unit 30 through a wiring and the onboard charging unit 30 is connected to the onboard battery 32. The work motor 22 and propulsion motors 26 are connected to the onboard battery 32 and are powered thereby. Related wiring is not illustrated (is omitted) in FIG. 1.

Two cameras (photographic equipment) 36 are installed on the front end of the work machine 10 to enable forward or stereographic)(360° observation. The cameras 36 are installed at the front of the body 12 of the work machine 10 at positions laterally symmetrical with respect to a center line CL1 extending in the straight forward direction of the work machine 10. The cameras 36 can instead be constituted as a single camera. Moreover, the camera(s) 36 can alternatively be configured to observe not only forward, but also to observe all around (360 degrees).

A contact sensor 40 attached to the frame 12b outputs an ON signal when the frame 12b detaches from the chassis 12a upon striking against an obstacle or foreign body.

A housing box (not shown) installed near the middle of the work machine 10 houses a printed circuit board 42 carrying an electronic control unit (hereinafter called "ECU") 44. As shown in FIG. 3, the ECU 44 comprises a microcomputer equipped with at least a processor (CPU) 44a, memory (ROM, EEPROM and RAM) 44b and I/O (input/output circuit) 44c.

The printed circuit board 42 is further provided thereon, in the vicinity of the ECU 44, with an angular velocity sensor 46 that generates an output indicating angular velocity (yaw rate) around a center-of-gravity z-axis (gravity axis) of the work machine 10, an acceleration sensor 50 that generates an output indicating acceleration acting on the work machine 10 in orthogonal three-axis (x, y and z) directions, and a direction sensor 52 that generates an output indicating absolute orientation in response to terrestrial magnetism.

Wheel speed sensors 54 installed near the left and right rear wheels 16 of the work machine 10 generate outputs indicating wheel speeds of the left and right rear wheels 16, and a lift sensor 56 installed between the chassis 12a and the frame 12b outputs an ON signal when the frame 12b is lifted (raised) off the chassis 12a by someone such as the user. A current sensor 60 installed on the onboard battery 32 generates an output indicating consumption of onboard battery 32 current.

The work machine 10 is equipped with a main switch 62 for instructing start of work operation and the like and an emergency stop switch 64 for instructing emergency stop, both of which are operable by the user. In addition, the frame 12b of the work machine 10 has a large cutaway in its upper surface, in which a keyboard, touch panel or other input device 66 is installed for inputting of instructions and the like by the user, and a display 70 is also installed.

The input device 66 and the display 70 are connected to the ECU 44, and the display 70 displays working modes and other various information in accordance with commands from the ECU 44. Moreover, the ECU 44 is configured to communicate through the I/O 44c with an external communication terminal 72, as shown in FIG. 3. The communication terminal 72 is a smartphone or other such PDA (Portable Digital Assistant) with communication function.

As shown in FIG. 3, outputs of the cameras 36, contact sensor 40, angular velocity sensor 46 and other sensors and outputs of the main switch 62 and other switches are sent to the ECU 44 and inputted through the I/O 44c. Outputs of the cameras 36 are similarly sent to an ECU-equipped image processing unit 36a, in which captured images are generated.

The ECU 44 supplies power of the onboard battery 32 to the propulsion motors 26 based on the output of the image processing unit 36 and other sensor outputs and outputs control values through the I/O 44c so as to run the propulsion motors 26 and control the work machine 10 to autonomously navigates.

The propulsion motors 26L and 26R are made capable of rotating the rear wheels 16 normally (forward direction rotation) or reversely (rearward direction rotation) independently on the left and right, whereby the work machine 10 can be turned in a desired direction by differentiating rotational speed between the left and right rear wheels 16.

For example, by rotating both the left and right rear wheels 16 normally and rotating the right rear wheel 16 faster than the left rear wheel 16, the work machine 10 can be turned left at a turning angle dependent on difference in wheel rotational speed. Conversely, by rotating the left rear wheel 16 faster than the right rear wheel 16, the work machine 10 can be turned right at a turning angle dependent on difference in wheel rotational speed. And by rotating one of the left and right rear wheels 16 normally and the other reversely at the same speed, the work machine 10 can be swiveled on the spot.

Figure 4:
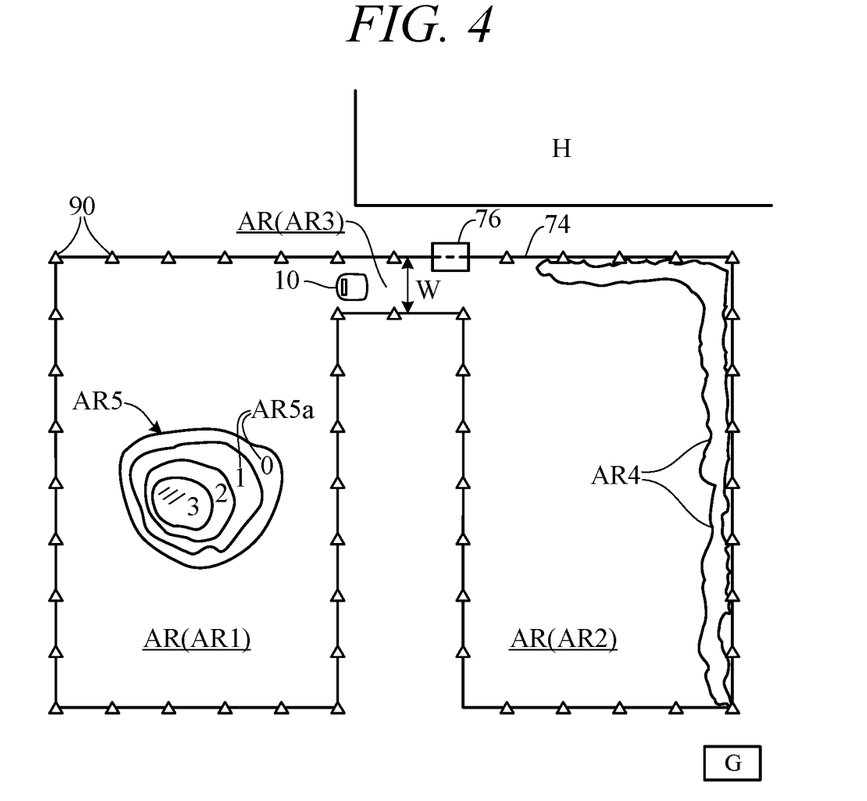
FIG. 4 is an explanatory view of work area of the work machine of FIG. 1.

Moreover, the ECU 44 detects (recognizes) the work area AR from the outputs of the sensors, particularly from the outputs of the cameras 36, and based on the detection, controls the work machine 10 to work in the work area AR by supplying power to the work motor 22. The work area AR is shown in FIG. 4.

Figure 5:
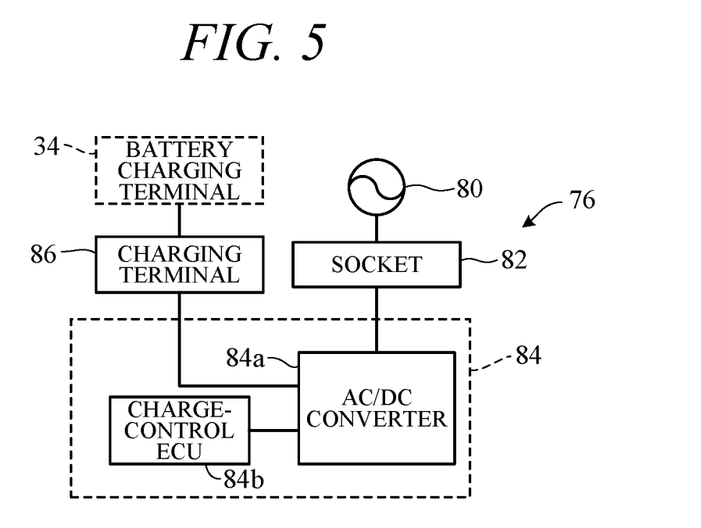
FIG. 5 is a block diagram showing the electrical structure of a charging station of FIG. 4.

A charging station (hereinafter called "charging ST") 76 for charging the onboard battery 32 of the work machine 10 is installed near the boundary 74 of the work area AR. FIG. 5 is a block diagram showing the electrical structure of the charging ST 76.

As indicated in the diagram, the charging ST 76 comprises a charging unit 84 connected through a socket 82 to an electrical power source (commercial power supply) 80, and a pair of charging terminals 86 connected to the charging unit 84. The charging terminals 86 are structured to be connectable to the pair of battery charging terminals 34 mounted on the work machine 10 (through contacts 34a thereof shown in FIG. 2).

The charging unit 84 is equipped with an AC/DC converter 84a and a charge-control ECU (Electronic Control Unit) 84b configured as a microcomputer for controlling operation of the AC/DC converter 84a.

In the charging ST 76, alternating current sent from the electrical power source 80 through the socket 82 is converted to direct current of suitably stepped down voltage by the AC/DC converter 84*a* of the charging unit 84 and sent to the charging terminals 86 to charge the onboard battery 32 of the work machine 10 after the work machine 10 returns to the charging ST 76 and connects (docks) through the charging terminals 86 and the battery charging terminals 34.

The work machine 10 can recognize the position of the charging ST 76 because a memory 44*b* of the ECU 44 in the work machine 10 stores images of the charging ST 76 and the ECU 44 determines its position by comparing the stored images with captured images obtained from the image processing units 36*a* of the cameras 36. Alternatively, charging of the onboard battery 32 of the work machine 10 can be performed wirelessly (inductively) without connecting the terminals 34 and 86.

There now follows an explanation with reference to FIG. 4 of the work area AR, its detection (recognition), and other aspects.

The ECU 44 detects (recognizes) the work area AR based on images captured by the image processing units 36*a* of the cameras 36 of markers 90 placed along the boundary (perimeter) 74 of the work area AR. The markers 90 are colored triangular blocks placed at suitable intervals along the boundary 74.

Using captured images received from the image processing units 36*a* and outputs from the wheel speed sensors 54, direction sensor 52 and other sensors, the ECU 44 in the work machine 10 controls the work machine 10 to circumnavigate the work area AR along the boundary 74, recognizes (detects) the overall work area AR, and generates a map (work area map) MP of the work area AR.

Figure 6:
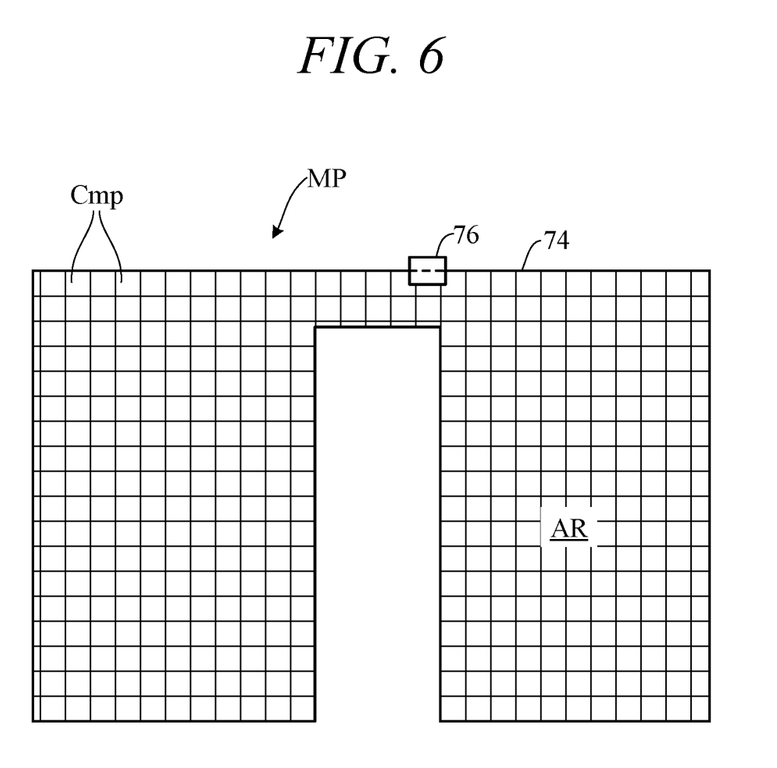
FIG. 6 is an explanatory view of a map of the work area of the work machine of FIG. 4.

The map MP is shown in FIG. 6. As illustrated, the map MP has its origin at the position of the charging ST 76 and is composed of data obtained by arraying multiple cells Cmp obtained by dividing the work area AR inside the boundary 74 into an equally spaced rectilinear grid in an orthogonal two-axis coordinate plane (XY plane) oriented with reference to a predetermined direction defined by the direction sensor 52.

Each of the cells Cmp in the map MP is of a size corresponding to a lateral width in the work area AR of, for example, about 0.5 m and each possesses data comprising of cell-specific position coordinates (X, Y coordinates). As elaborated later, the ECU 44 controls navigation of the work machine 10 based on the illustrated map MP.

Returning to FIG. 4 to resume the explanation of the work area AR, the work area AR in this embodiment comprises two rectangular regions AR1 and AR2 and a narrow passage AR3 of constricted width connecting the regions AR1 and AR2. Width W of narrow passage AR3 is not less than m times (e.g., 1.5 times) and not greater than n times (e.g., 4 times) lateral width of the work machine 10.

Moreover, the work area AR is formed in the vicinity between a gate G of premises where user resides and a house H with a path AR4 for user and others, and the path AR4 is either a region not planted with lawn from the start or, if planted, a region where lawn grass hardly grows.

In addition, the region AR1 includes a pond surrounded by a slope. The pond and its surrounding slope AR5 are landscaped so that, as viewed in FIG. 4, the slope is steeper (sharper) on the left side than on the right side.

In this embodiment, when the aforesaid narrow passage AR3 is detected on the map MP or when the path AR4 is inputted through the input device 66 or the communication terminal 72, they are deemed navigation desired regions where navigation is desired (by user), and when the pond and surrounding slope AR5 are inputted through the input device 66 or communication terminal 72, they are deemed navigation-unsuitable regions which are unsuitable for navigation.

In this embodiment, the term "navigation-desired region" refers to a region inside or outside of the work area AR whose selection is especially desired such as in a case where reliable return to the charging ST 76 is desired when charge of the onboard battery 32 of the work machine 10 falls below a threshold value or in a case where after completion of work in one of the regions AR1 and AR2 movement to the other is desired, and the term "navigation-unsuitable region" refers to a region where navigation is not suitable in such a case.

As discussed later, when the narrow passage AR3 is detected or when these are inputted through the input device 66 or the like, the ECU 44 acquires position data of the cells Cmp on the map MP relating to these as data related to navigation-desired regions.

Namely, as seen in FIG. 3, the ECU 44 is configured to operate (perform) as an information acquisition unit 44*a*1 that acquires information relating to a navigation-desired region or the like, a search unit 44*a*2 that searches for a navigation route from the current location of the work machine 10 in the work area AR to a desired location (e.g., the charging ST 76) based on the acquired information relating to the navigation-desired region or the like, and a control unit 44*a*3 that drives the work machine 10 to run by driving the electric motors (drive units) 26 in accordance with the navigation route searched by the search unit.

When the navigation-unsuitable region includes the pond and surrounding slope AR5, as shown in FIG. 4, they are tagged with (assigned) unsuitability rates AR5*a* indicating a local degree of navigation unsuitability. The unsuitability rates AR5a exhibit contour line-like characteristics and are established at closer line intervals in proportion as slope steepness is greater, irrespective of whether concave or convex, and are assigned numerical values such as 0, 1, 2, 3 . . . that increase from outside to inside (toward pond).

The navigation-unsuitable region is not limited to this type (ponds and their surroundings) but can also be defined to include narrow bridges that the work machine 10 might fall off, places where a user does not want to make ruts, and the surroundings of such places.

Operations of the ECU 44 are explained in the following with reference to the flowchart of FIG. 7.

Now to explain, in S10 (S: processing Step), the work machine 10 is driven to circumnavigate the work area AR along the markers 90 marking the boundary 74, thereby generating a map MP that is stored in the memory 44*b*. The map MP can be accessed from outside the work machine 10 through the I/O 44*c* and the communication terminal 72.

Next, in S12, it is determined whether a user or helper inputs the path AR4 or the like through the input device 66 as a navigation-desired region. When the result in S12 is YES, the program goes to S14 to enter the same in the corresponding cells of the map MP (acquire information relating to the navigation-desired region), and when the result is NO, the processing of S14 is skipped.

Next, in S16, it is determined whether a user or helper inputs AR5 or other navigation-unsuitable region through the input device 66. When the result in S16 is YES, the program goes to S18 to enter the same in the corresponding cells of the map MP (acquire information relating to the navigation-unsuitable region), and when the result is NO, subsequent processing is skipped.

Next, in S20, it is determined whether the map MP contains a narrow passage AR3. When the result is YES, the program goes to S22 to enter the same in the corresponding cells of the map MP as a navigation-desired region (acquire information relating to the navigation-desired region).

The reasoning here is that since the narrow passage AR3 is a region necessarily traversed in order, for example, to move from the first serviced to the next serviced of the regions AR1 and AR2, the probability of its lawn being trampled and dotted with bald spots is high. The narrow passage AR3 is therefore preferentially traversed so as to minimize lawn balding in other regions. When the result in S20 is NO, the processing of S22 is skipped.

Next, in S24, it is determined whether a user or helper inputs the path AR4 or the like through the communication terminal 72 as a navigation-desired region. When the result in S24 is YES, the program goes to S26 to enter the same in the corresponding cells of the map MP as a navigation-desired region (acquire information relating to the navigation-desired region), and when the result is NO, the processing of S26 is skipped.

Next, in S28, it is determined whether a user or helper inputs AR5 or other navigation-unsuitable region through the communication terminal 72. When the result in S28 is YES, the program goes to S30 to enter the same in the corresponding cells of the map MP as a navigation-unsuitable region (acquire information relating to the navigation-unsuitable region), and when the result S28 is NO, the processing of S30 is skipped.

Next, in S32, it is determined whether a heavily walked region other than the aforesaid path AR4 was detected in the captured images outputted from the image processing units 36a. When the result is YES, the program goes to S34 to enter the same in the corresponding cells of the map MP as a navigation-desired region (acquire information relating to the navigation-desired region).

The reasoning here is that a heavily walked region is highly likely to have trampled lawn dotted with bald spots or to be not planted with lawn in the first place, and such a region is therefore preferentially traversed so as to minimize lawn balding in other regions. When the result in S32 is NO, the processing of S34 is skipped.

Next, in S36, it is determined whether a region not planted with lawn other than the aforesaid path AR4 was detected in the captured images outputted from the image processing units 36a. When the result is YES, the program goes to S38 to enter the same in the corresponding cells of the map MP as a navigation-desired region (acquire information relating to the navigation-desired region).

This is to minimize lawn balding in other regions by preferentially traversing regions not planted with lawn. When the result in S36 is NO, subsequent processing is skipped.

Figure 7:
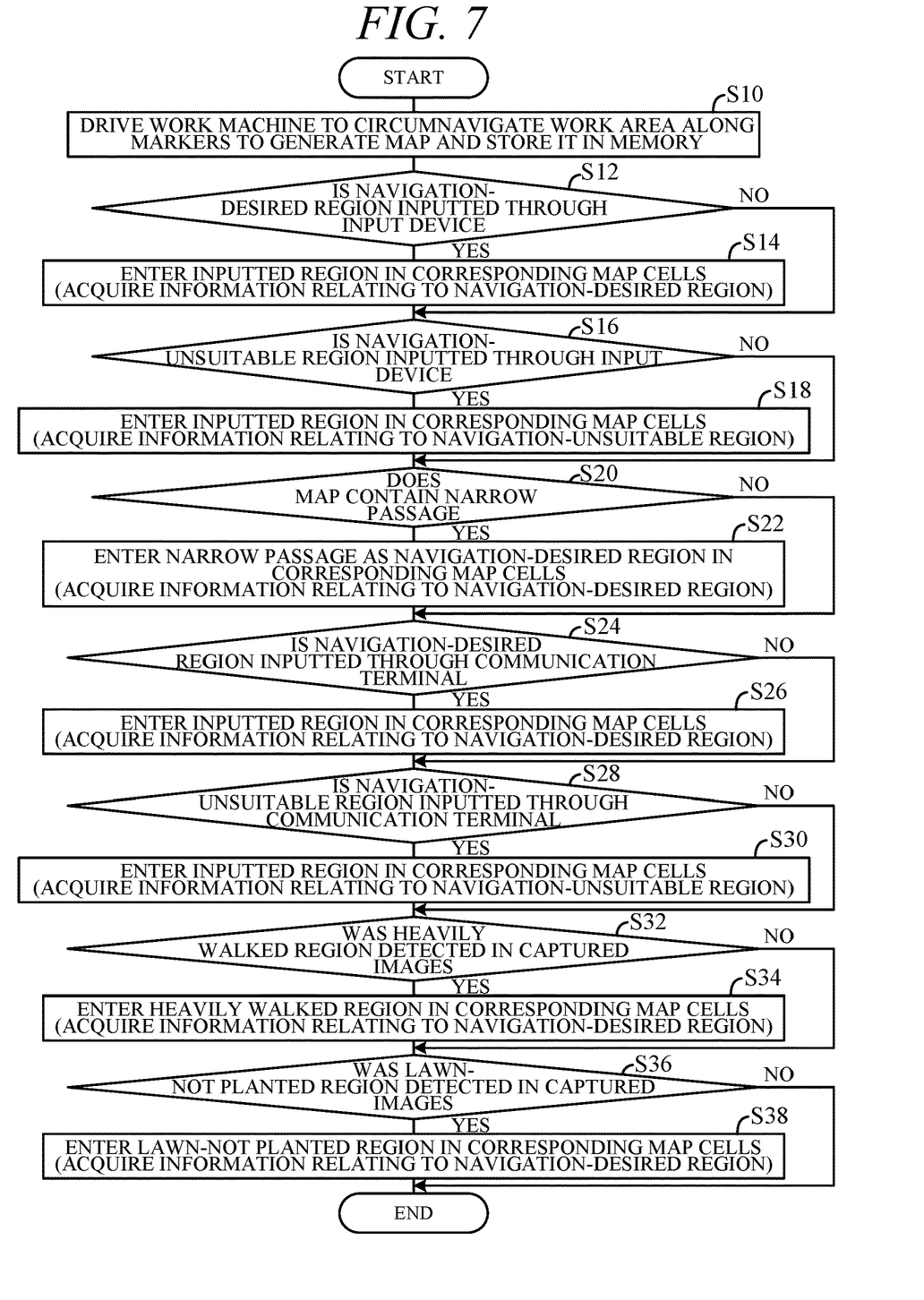
FIG. 7 is flowchart showing operations of the ECU of FIG. 3.
Figure 8:
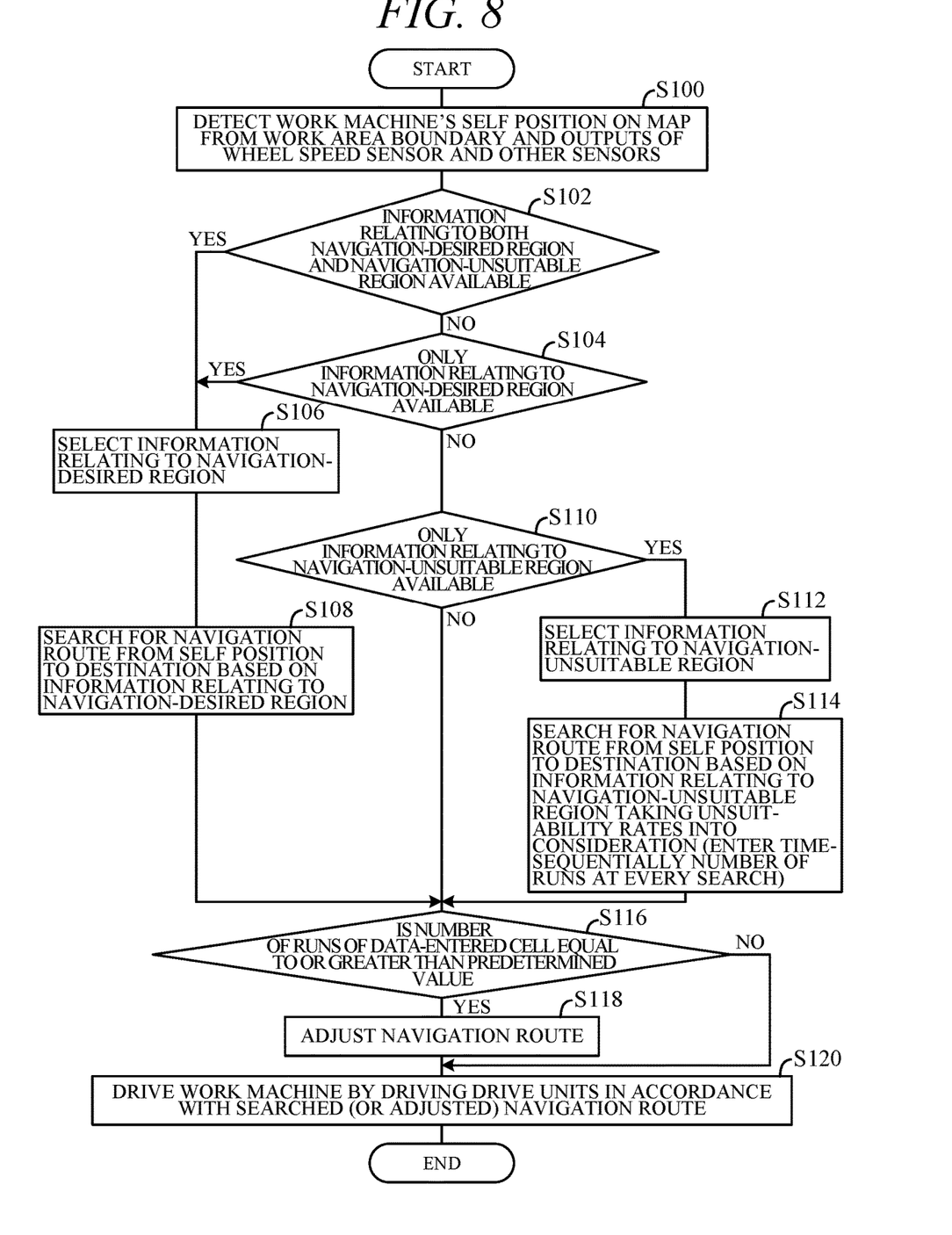
FIG. 8 is a flowchart showing processing performed by the ECU following the processing of FIG. 7.

FIG. 8 is a flowchart showing processing performed by the ECU 44 following the processing of FIG. 7.

Now to explain, in S100 self-position of the work machine 10 on the map MP is detected or ascertained from the boundary 74 of the work area AR and outputs of the wheel speed sensors 54 and other sensors.

Next, in S102, it is determined whether information relating to a navigation-desired region and information relating to a navigation-unsuitable region is available. When the result is NO, the program goes to S104 to determine whether only information relating to a navigation-desired region is available.

When the result in S102 or S104 is YES, the program goes to S106 to select information relating to a navigation-desired region and to S108 to search for a navigation route from the self-position to a destination based on information relating to the navigation-desired region and to time-sequentially enter (store) a number of runs at a corresponding address of navigated cells Cmp of the memory 44b at every search.

To be more specific, the self-position relative to boundary 74 of the work area AR is detected from outputs of, inter alia, the wheel speed sensors 54 and direction sensor 52 and navigation route search is performed so as to shorten the run from there to the destination (charging ST 76) to the shortest possible while passing through the navigation-desired region. Optionally, instead of using output of the direction sensor 52, it is possible to use captured images of the cameras 36 or to install a GPS receiver and use its output.

On the other hand, when the results in S102 and S104 are NO, the program goes to S110 to determine whether only information relating to a navigation-unsuitable region is present, and when the result is YES, to S112 to select information relating to the navigation-unsuitable region.

Next, in S114, a navigation route from the self-position to the destination is searched for based on information relating to the navigation-unsuitable region and a number of runs is time-sequentially entered (stored) at the corresponding address of navigated cells Cmp of the memory 44b at every search.

The navigation route search and entry are basically the same as when the navigation route search and entry are based on information relating to a navigation-desired region, but in the case of a navigation route search based on information relating to a navigation-unsuitable region, the search is performed taking unsuitability rates AR5a into consideration.

Let's look at this with reference to the unsuitability rates AR5a associated with the pond and surrounding slope AR5 shown in FIG. 4. Unsuitability rate increases numerically as one goes from the surrounding region toward the center of the pond. Accordingly, when searching for a navigation route via the slope AR5 surrounding the pond, the navigation route is calculated not by selecting the shortest distance to the destination but by selecting a region of small numerical value. As a result, it becomes possible, while avoiding a navigation-unsuitable region such as a pond, to also perform control for changing the distance from the pond little by little with each run and thereby avoid rut overlap.

When the result in S110 is NO, the processing of S114 is skipped. Next, in S116, it is determined whether the number of runs of data-entered (stored) cells Cmp is equal to or greater than an appropriately set predetermined value. When the result is YES, the program goes to S118 to adjust the navigation route searched in S108 or S114. When the result in S116 is NO, the processing of S118 is skipped.

Next, in S120, the subject machine (work machine) 10 is driven by driving the drive units (propulsion motors 26) in accordance with the searched (or adjusted) navigation route.

Owing to the aforesaid configuration of this embodiment, the navigation route of the work machine 10 running toward its destination can be controlled to pass through preferred navigation-desired region to the utmost possible.

Second Embodiment

Figure 9:
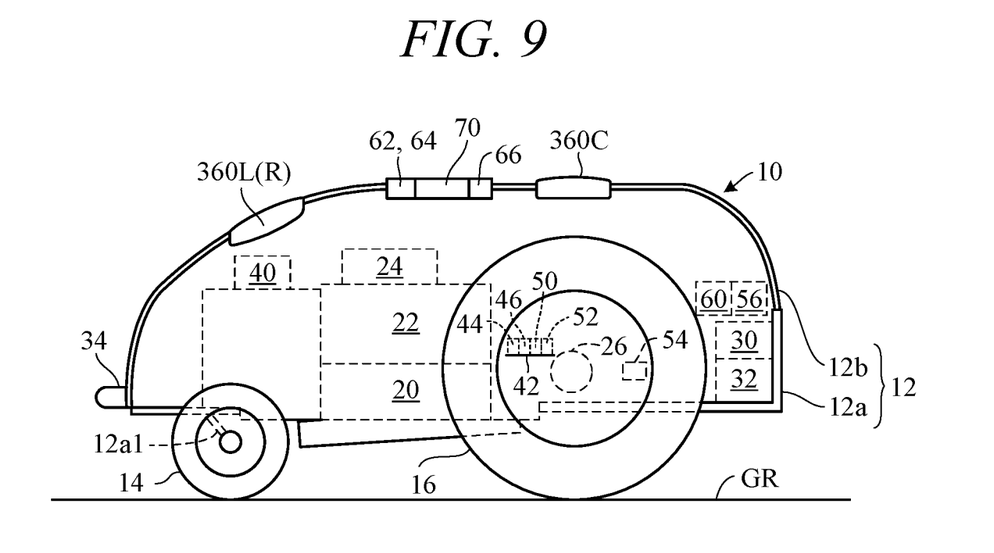
FIG. 9 is a conceptual diagram, similar to FIG. 1, but showing an overview of an autonomously navigating work machine in accordance with a second embodiment of this invention.
Figure 10:
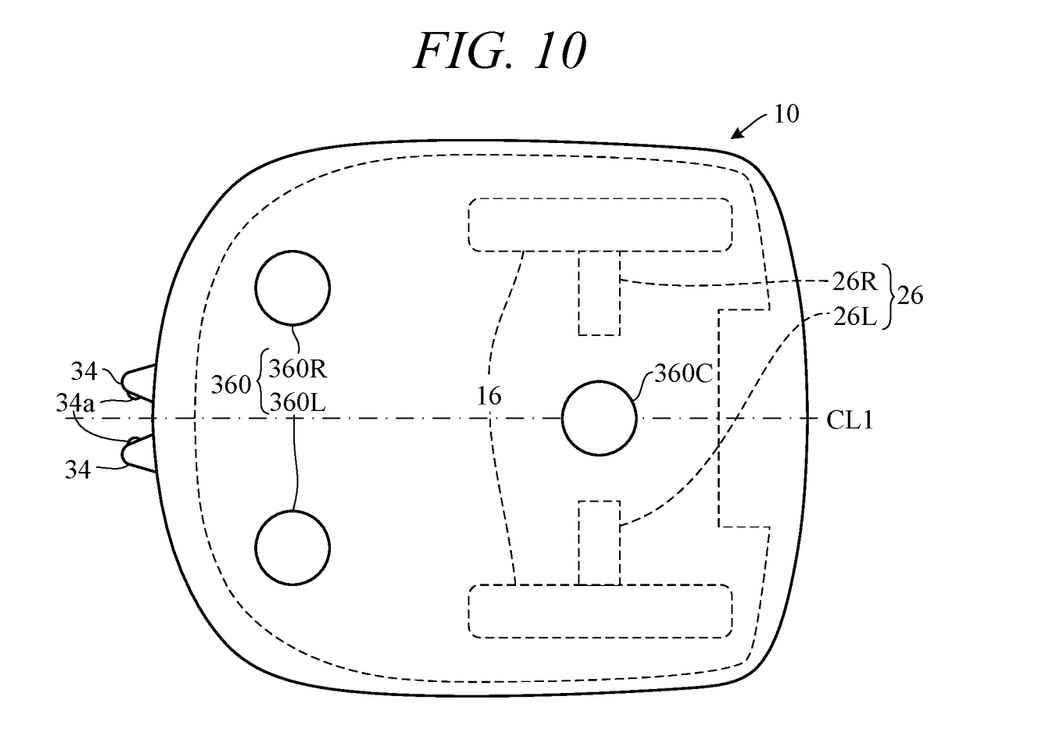
FIG. 10 is a top view of the autonomously navigating work machine of FIG. 9.
Figure 11:
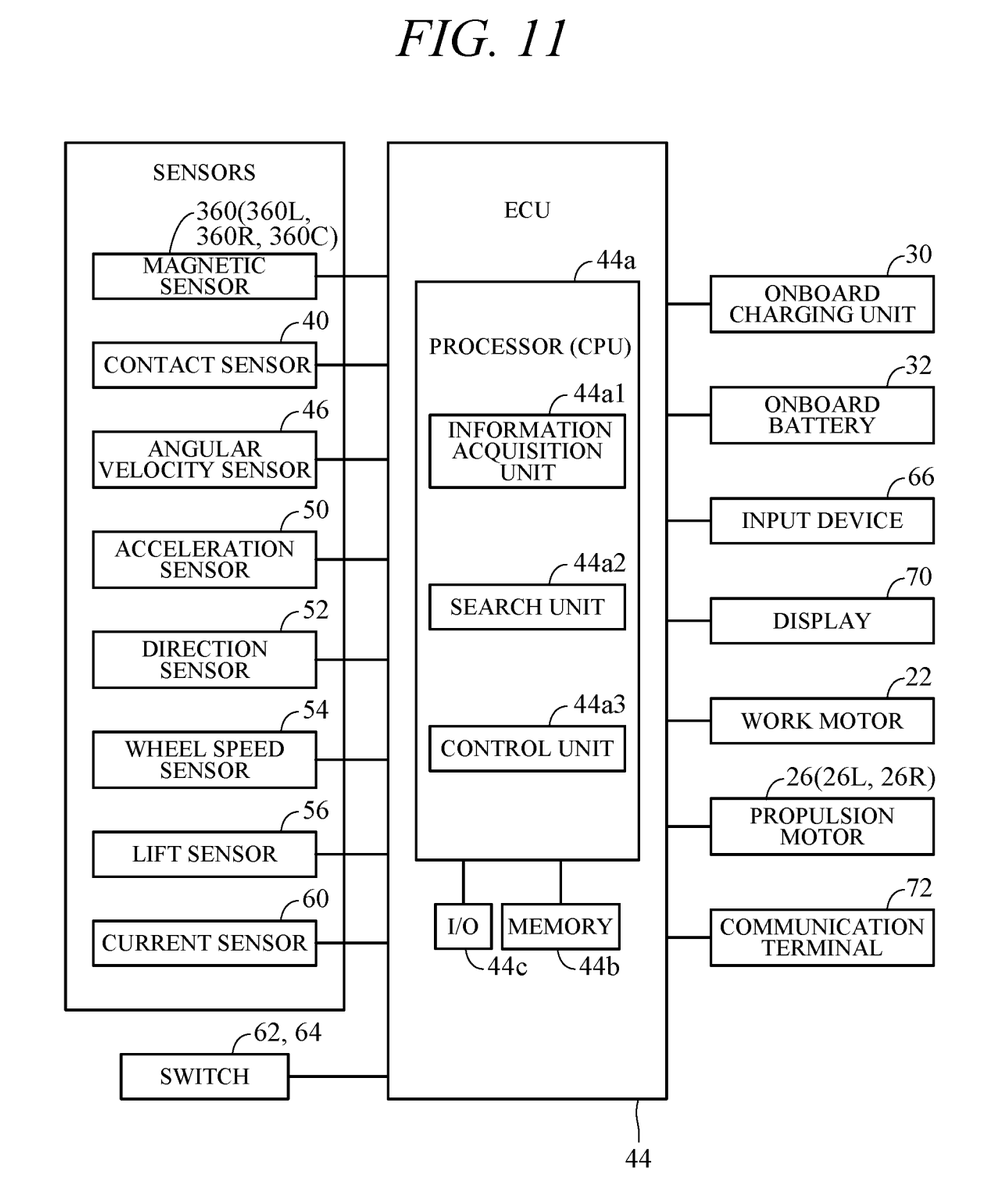
FIG. 11 is a block diagram, similar to FIG. 3, but showing input-output relationships of an ECU of FIG. 10.

FIG. 9 is a conceptual diagram, similar to FIG. 1, but showing an overview of an autonomously navigating work machine in accordance with a second embodiment of this invention. FIG. 10 is a top view of the autonomously navigating work machine of FIG. 9. FIG. 11 is a block diagram, similar to FIG. 3, but showing input-output relationships of an ECU of FIG. 10.

Turning to an explanation focused on points of difference from the first embodiment, in the second embodiment recognition of the boundary 74 of the work area AR relies not on the cameras 36 and image processing units 36a but instead on two magnetic sensors 360L and 360R installed on the front left and right of the work machine 10 and a single magnetic sensor 360C installed on the rear of the work machine 10.

To be more specific, an electric wire is buried in the ground under the boundary 74 of the work area AR, direct current is passed through the wire from the AC/DC converter 84a of the charging unit 84 shown in FIG. 5, and the boundary 74 of the work area AR is detected by detecting the current with the magnetic sensors 360. As details regarding this aspect are described in, for example, U.S. Pat. No. 9,740,204, further explanation is omitted here.

As described in the foregoing, the first and second embodiments of this invention are configured to have a control apparatus of an autonomously navigating work machine (10) driven by drive units (work motors) (26) while servicing a work area (AR), comprising: an information acquisition unit (44a1, S14, S22, S26, S34, S38) that acquires information relating to a navigation-desired region where navigation is desired inside or outside of the work area (AR); a search unit (44a2, S102, S14, S106, S108) that searches for a navigation route from the current location of the work machine to a desired location based on acquired information relating to the navigation-desired region; and a control unit (44a3, S120) that drives the work machine (10) to run by driving the drive units in accordance with the navigation route searched by the search unit. With this, when the work machine 10 navigates toward the charging ST 76 or other destination, the navigation route can be controlled to pass through a preferred navigation-desired region to the utmost possible and thereby prevent disadvantages such as lawn-balding in the work area AR.

Moreover, it is configured such that the information acquisition unit acquires, in addition to the information relating to a navigation-desired region, information relating to a navigation-unsuitable region unsuitable for navigation inside or outside the work area (S18, S30) and the search unit searches for the navigation route based on information relating to at least one of the acquired navigation-desired region and the navigation-unsuitable region (S108, S110, S112, S114). With this, in addition to the aforesaid effects, navigation in a navigation-desired region through which passage is preferentially desired can be prioritized.

In addition, it is configured such that the information relating to a navigation- unsuitable region (AR5) acquired by the information acquisition unit is tagged with unsuitability rates (AR5a) indicating a local degree of navigation unsuitability and the search unit searches for the navigation route taking the unsuitability rates into account when searching for the navigation route based on the information relating to a navigation-unsuitable region (S114). With this, in addition to the aforesaid effects, navigation in a navigation-unsuitable region can be effectively controlled. For example, when a navigation-unsuitable region is a pond and surrounding slope AR5, occurrence of ruts and the like caused by following same route can be avoided by modifying the route at each run taking the assigned unsuitability rates AR5a into consideration.

Further, it is configured such that the unsuitability rates (AR5a) are given contour line-like characteristics. With this, in addition to the aforesaid effects, the degree of unsuitableness in a navigation-unsuitable region can be expressed as a function of ground inclination angle, thereby enabling still more effective control of navigation in a navigation-unsuitable region.

Moreover, it is configured such that the apparatus includes an electronic control unit (ECU) (44) that comprises at least a processor (44a), a memory (44b) that stores data written to a map (MP) expressing the work area as an array of cells (Cmp), and an input/output circuit (I/O) (44c), and when a narrow passage of constricted width is detected in the map, the information acquisition unit acquires data of corresponding cells of the detected narrow passage as the information relating to a navigation-desired region (S20, S22). With this, in addition to the aforesaid effects, it becomes possible to save a user or helper the trouble of inputting data.

Still further, it is configured such that the information acquisition unit acquires information inputted from an input device (66) connected through the input/output circuit as the information (S12 to S18). With this, in addition to the aforesaid effects, a user or helper can easily input information relating to a navigation-desired region or navigation-unsuitable region.

In addition, it is configured such that the information acquisition unit acquires information inputted from an external communication terminal connected through the input/output circuit as the information (S24 to S30). With this, in addition to the aforesaid effects, a user or helper can easily input information relating to a navigation-desired region or navigation-unsuitable region.

Moreover, it is configured such that the apparatus includes photographic equipment (cameras 36, image processing units 36a) that photographs the work area and the information acquisition unit acquires the information from an image captured by the photographic equipment (S32 to S38). With this, in addition to the aforesaid effects, information relating to a navigation-desired region or navigation-unsuitable region can be easily inputted without imposing work on user.

Moreover, it is configured such that the work machine (10) is a lawnmower and the information acquisition unit acquires information regarding at least one of a heavily walked region and a region not planted with lawn as the information relating to a navigation-desired region (S32 to S38). With this, in addition to the aforesaid effects, information relating to a heavily walked, unplanted and other such navigation-desired regions can be easily inputted without imposing work on user.

Furthermore, it is configured such that the search unit time-sequentially stores the searched navigation route in the memory as a number of runs on the cells (Cmp) of the map (MP) and modifies the searched navigation route when the total value of the sequentially stored number of runs becomes equal to or greater than a predetermined value (S108; S114 to S120). With this, in addition to the aforesaid effects, occurrence of ruts and the like caused by following the same route can be avoided by avoiding navigation route overlap.

A noteworthy point here is that even in the case set out in the foregoing of not using the cameras 36 but instead using the magnetic sensors 360 to recognize the boundary 74 of the work area AR, as in the second embodiment, necessary information can nevertheless be acquired by input through the input device 66 or communication terminal 72, from which it follows that recognition of the boundary 74 of the work area AR can be performed in any manner in this invention.

Although the work machine 10 is applied as a lawn mowing machine in the foregoing description, this invention is not limited to this application but can also be applied to any of various other kinds of autonomously navigating work machines.

INDUSTRIAL APPLICABILITY

The control apparatus of autonomously navigating work machine according to this invention can be suitably used to control work machines capable of autonomous navigation.

DESCRIPTION OF SYMBOLS

10 autonomously navigating work machine (work machine), 12 body, 14 front wheels, 16 rear wheels, 20 blade (work unit), 22 electric motor (work motor), 24 blade height regulation mechanism, 26 electric motor (drive unit; propulsion motor), 30 onboard charging unit, 32 onboard battery, 34 battery charging terminals, 36 camera, 36a image processing unit, 360 magnetic sensor, 44 electronic control unit (ECU), 44a processor, 44a1 information acquisition unit, 44a2 search unit, 44a3 control unit, 46 angular velocity sensor, 50 acceleration sensor, 52 direction sensor, 66 input device, 70 display, 72 communication terminal, 74 boundary, 76 charging station (ST), 84 charging unit, 86 charging terminals, AR work region, AR3 narrow passage, AR4 navigation-desired region (path), AR5 navigation-unsuitable region (pond and surrounding slope)

The invention claimed is:

1. A control apparatus of an autonomously navigating lawnmower driven by drive units while servicing a work area, comprising:
    an information acquisition unit that acquires information regarding at least one of a region not planted with lawn and a region with lawn balding as information relating to a navigation-desired region where navigation is desired inside or outside of the work area;
    a search unit that searches for a navigation route passing through the navigation-desired region from a current location of the lawnmower to a desired location based on the acquired information relating to the navigation-desired region so as to minimize lawn balding in other regions; and
    a control unit that controls the lawnmower to run by driving the drive units in accordance with the navigation route searched by the search unit.

2. The apparatus according to claim 1, wherein the information acquisition unit acquires, in addition to the information relating to the navigation-desired region, information relating to a navigation-unsuitable region unsuitable for navigation inside or outside the work area and the search unit searches for the navigation route based on information relating to at least one of the acquired navigation-desired region and the acquired navigation-unsuitable region.

3. The apparatus according to claim 2, wherein the information relating to the navigation-unsuitable region acquired by the information acquisition unit is tagged with unsuitability rates indicating a local degree of navigation unsuitability and the search unit searches for the navigation route taking the unsuitability rates into account when searching for the navigation route based on the information relating to the navigation-unsuitable region.

4. The apparatus according to claim 3, wherein the unsuitability rates are given contour line-like characteristics.

5. The apparatus according to claim 2, further including:
    an electronic control unit that comprises at least a processor, and a memory that stores data written to a map expressing the work area as an array of cells, and an input/output circuit; and
    wherein when a narrow passage of constricted width is detected in the map, the information acquisition unit acquires information regarding the cells corresponding to the detected narrow passage as the information relating to the navigation-desired region.

6. The apparatus according to claim 5, wherein the information acquisition unit acquires information inputted from an input device connected through the input/output circuit as the information relating to the navigation-desired region and the information relating to the navigation-unsuitable region.

7. The apparatus according to claim 5, wherein the information acquisition unit acquires information inputted from an external communication terminal connected through the input/output circuit as the information relating to the navigation-desired region and the information relating to the navigation-unsuitable region.

8. The apparatus according to claim 2, further including:
    photographic equipment that photographs the work area;
    wherein the information acquisition unit acquires the information from an image captured by the photographic equipment.

9. The apparatus according to claim 5, wherein the search unit time-sequentially stores the searched navigation route in the memory as a number of runs on the cells of the map and modifies the searched navigation route when a total value of the sequentially stored number of runs becomes equal to or greater than a predetermined value.

10. A control apparatus of an autonomously navigating lawnmower driven by drive units while servicing a work area, comprising:
    a computer equipped with at least a processor and a memory coupled to the processor,
    wherein the processor is configured to perform as:
    an information acquisition unit that acquires information regarding at least one of a region not planted with lawn and a region with lawn balding as information relating to a navigation-desired region where navigation is desired inside or outside of the work area;
    a search unit that searches for a navigation route passing through the navigation-desired region from a current location of the lawnmower to a desired location based on the acquired information relating to the navigation desired region so as to minimize lawn balding in other regions; and
    a control unit that controls the lawnmower to run by driving the drive units in accordance with the navigation route searched by the search unit.

11. The apparatus according to claim 10, wherein the information acquisition unit acquires, in addition to the information relating to the navigation-desired region, information relating to a navigation-unsuitable region unsuitable for navigation inside or outside the work area and the search unit searches for the navigation route based on information relating to at least one of the acquired navigation-desired region and the acquired navigation-unsuitable region.

12. The apparatus according to claim 11, wherein the information relating to the navigation-unsuitable region acquired by the information acquisition unit is tagged with unsuitability rates indicating a local degree of navigation unsuitability and the search unit searches for the navigation route taking the unsuitability rates into account when searching for the navigation route based on the information relating to the navigation-unsuitable region.

13. The apparatus according to claim 12, wherein the unsuitability rates are given contour line-like characteristics.

14. The apparatus according to claim 11, wherein the memory stores data written to a map expressing the work area as an array of cells, and the apparatus further includes an input/output circuit, and when a narrow passage of constricted width is detected in the map, the information acquisition unit acquires information regarding the cells corresponding to the detected narrow passage as the information relating to the navigation-desired region.

15. The apparatus according to claim 14, wherein the information acquisition unit acquires information inputted from an input device connected through the input/output circuit as the information relating to the navigation-desired region and the information relating to the navigation-unsuitable region.

16. The apparatus according to claim 14, wherein the information acquisition unit acquires information inputted from an external communication terminal connected through the input/output circuit as the information relating to the navigation-desired region and the information relating to the navigation-unsuitable region.

17. The apparatus according to claim 11, further including:
photographic equipment that photographs the work area, wherein the information acquisition unit acquires the information from an image captured by the photographic equipment.

18. The apparatus according to claim 14, wherein the search unit time-sequentially stores the searched navigation route in the memory as a number of runs on the cells of the map and modifies the searched navigation route when a total value of the sequentially stored number of runs becomes equal to or greater than a predetermined value.

* * * * *